(12) United States Patent
Vasu (10) Patent No.: US 11,611,588 B2
(45) Date of Patent: Mar. 21, 2023

(54) DEEP LEARNING NETWORK INTRUSION DETECTION

(71) Applicant: KYNDRYL, INC., New York, NY (US)

(72) Inventor: Karthick Vasu, Chennai (IN)

(73) Assignee: KYNDRYL, INC., New York, NY (US)

( * ) Notice: Subject to any disclaimer, the term of this patent is extended or adjusted under 35 U.S.C. 154(b) by 304 days.

(21) Appl. No.: 16/925,410

(22) Filed: Jul. 10, 2020

(65) Prior Publication Data

US 2022/0014554 A1 Jan. 13, 2022

(51) Int. Cl.
*H04L 9/40* (2022.01)
*G06N 3/04* (2023.01)
*G06N 3/088* (2023.01)

(52) U.S. Cl.
CPC .......... *H04L 63/20* (2013.01); *G06N 3/0454* (2013.01); *G06N 3/088* (2013.01); *H04L 63/1416* (2013.01); *H04L 63/1425* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS 7,587,598 B2 * 9/2009 Ohba ................ H04L 63/08
713/169
7,917,758 B2 * 3/2011 Palekar ............. H04L 63/08
709/227

(Continued)

FOREIGN PATENT DOCUMENTS

CN 101902744 12/2010
CN 101980506 2/2011
(Continued)

OTHER PUBLICATIONS

Lin et al., "DSGAN: Generative Adversarial Networks for Attack Generation against Intrusion Detection", arXiv:1809.02077v3 [cs.CR] Jun. 16, 2019, 8 pages.

(Continued)

*Primary Examiner* — Sharif E Ullah
(74) *Attorney, Agent, or Firm* — Erik Swanson; Andrew M. Calderon; Calderon Safran & Cole P.C.

(57) ABSTRACT

One or more computer processors intercept one or more network inputs entering or existing an internal network; synthesize one or more network input images from a random noise vector sampled from a normal distribution of textually embedded network inputs utilizing a trained generative adversarial network; classify one or more synthesized network input images by identifying contained objects utilizing a trained convolutional neural network with rectified linear units, wherein the objects include patterns, sequences, trends, and signatures; predict a security profile of the one or more classified network input images and associated one or more network inputs, wherein the security profiles includes a set of rules and associated mitigation actions, analogous historical network traffic, a probability of infection, a probability of signature match with historical malicious network inputs, and a harm factor; apply one or more mitigation actions based on the predicted security profile.

20 Claims, 5 Drawing Sheets

(56) References Cited

U.S. PATENT DOCUMENTS

| | | | |
|---|---|---|---|
| 7,941,855 B2* | 5/2011 | Sung | H04L 63/1408 713/188 |
| 8,843,738 B2* | 9/2014 | Vos | H04L 69/22 709/224 |
| 9,026,784 B2* | 5/2015 | Buruganahalli | H04L 63/20 713/176 |
| 9,608,963 B2* | 3/2017 | Lu | H04L 67/14 |
| 10,009,183 B2* | 6/2018 | Pahl | G06F 21/33 |
| 10,367,841 B2* | 7/2019 | Arnaldo | H04L 63/1416 |
| 10,670,890 B2* | 6/2020 | Graff | G02C 5/2209 |
| 2004/0054505 A1* | 3/2004 | Lee | H04L 63/1466 702/186 |
| 2008/0098207 A1* | 4/2008 | Reid | G06F 11/3636 714/E11.207 |
| 2017/0268001 A1* | 9/2017 | Khodarev | A61K 31/713 |
| 2018/0247195 A1* | 8/2018 | Kumar | G06N 3/08 |
| 2018/0268222 A1* | 9/2018 | Sohn | G06T 7/70 |
| 2018/0307188 A1* | 10/2018 | Mummadi | G06N 3/0454 |
| 2018/0308012 A1* | 10/2018 | Mummadi | G06N 3/0454 |
| 2018/0349324 A1* | 12/2018 | Krappé | G06F 16/435 |
| 2019/0052656 A1* | 2/2019 | Sofka | G06N 3/0445 |
| 2019/0147343 A1* | 5/2019 | Lev | G06K 9/6284 706/25 |
| 2019/0370440 A1* | 12/2019 | Gu | G06N 3/0481 |
| 2019/0392140 A1* | 12/2019 | Kawakita | G06N 3/006 |
| 2020/0042701 A1* | 2/2020 | Yang | H04L 63/1416 |
| 2020/0097853 A1* | 3/2020 | Golovin | G06N 3/08 |
| 2020/0111018 A1* | 4/2020 | Golovin | G06F 11/3409 |
| 2020/0167691 A1* | 5/2020 | Golovin | G06N 3/08 |
| 2020/0242250 A1* | 7/2020 | Chen | G06F 21/577 |
| 2021/0304009 A1* | 9/2021 | Bazarsky | G06N 3/06 |
| 2022/0004818 A1* | 1/2022 | Koopman | G06K 9/6256 |
| 2022/0012572 A1* | 1/2022 | Chen | G06N 3/063 |
| 2022/0043978 A1* | 2/2022 | Wang | G06F 40/289 |
| 2022/0044283 A1* | 2/2022 | Briancon | G06N 3/006 |
| 2022/0046057 A1* | 2/2022 | Kutt | H04L 63/1483 |

FOREIGN PATENT DOCUMENTS

| | | |
|---|---|---|
| CN | 104348827 | 2/2015 |
| CN | 105208037 | 12/2015 |
| CN | 105956473 | 9/2016 |
| CN | 107104960 | 8/2017 |
| CN | 108924129 | 11/2018 |
| CN | 110336830 | 10/2019 |
| CN | 110875912 | 3/2020 |
| EP | 2833594 | 2/2015 |
| KR | 102002880 B1 | 7/2019 |
| WO | 2018139458 | 8/2018 |

OTHER PUBLICATIONS

International Search Report and Written Option of the International Searching Authority from PCT Application No. PCT/CN2021/099266 dated Sep. 8, 2021, 9 pages.

* cited by examiner

DEEP LEARNING NETWORK INTRUSION DETECTION

BACKGROUND

The present invention relates generally to the field of deep learning, and more particularly to intrusion detection utilizing deep learning.

An intrusion detection system (IDS) is a device or software application that monitors a network or systems for malicious activity or policy violations. Typically, intrusion activity or violation is logged and/or reported to an administrator. IDSs include network-based intrusion detection systems (NIDS) (e.g., analyzes incoming network traffic) and host-based intrusion detection systems (HIDS) (e.g., monitors important operating system files).

Neural networks (NNs) are computing systems inspired by biological neural networks. NNs are not simply algorithms, but rather a framework for machine learning algorithms to process complex inputs. Such systems "learn" to perform tasks by considering training examples, generally without being programmed with any task-specific rules. NNs are based on a collection of connected units or nodes called artificial neurons, which loosely model the neurons in a biological brain where each artificial neuron can transmit a signal from one artificial neuron to another. Here, an artificial neuron receives a signal which said artificial neuron can process the signal and, subsequently, transfer the signal to additional artificial neurons. In common NN implementations, a signal at a connection between artificial neurons is a real number, and the output of each artificial neuron is computed by a non-linear function of the sum of the inputs. Artificial neurons and edges, typically, have respective weights that adjust as learning proceeds. The respective weights increase or decrease a strength of a signal at a connection. Artificial neurons may have a threshold such that a signal is only sent if an aggregate signal crosses the threshold. Typically, artificial neurons are aggregated into layers where a plurality of layers perform a plurality of data transformations on inputs.

Convolutional neural networks (CNN) are a class or subcategory of neural networks, most commonly applied to analyzing visual imagery. CNNs are regularized versions of multilayer perceptrons (e.g., fully connected network), where each neuron in a layer is connected to all neurons in a subsequent layer. CNNs take advantage of the hierarchical pattern in data and derive more complex patterns utilizing tuned patterns. CNNs break down images into kernels (e.g., 5×5 pixel) and iterate across the image by a designated stride length. CNNs use relatively little pre-processing compared to other image classification algorithms, allowing the network to learn the filters that in traditional algorithms were hand-engineered.

A generative adversarial network (GAN) is a class or subcategory of machine learning system comprising of two neural networks (i.e., generative and discriminative). GANs learn to generate new data with similar data statistics as indicated in a provided training set. For example, a GAN trained with a training set of photographs can generate new photographs that look, at least superficially, authentic to human observers. A contained generative network generates candidates while the discriminative network evaluates generated candidates. Typically, the generative network learns to map from a latent space to a data distribution of interest, while the discriminative network distinguishes generated candidates from the training set data distribution. The generative network increases an error rate of the discriminative network (i.e., inducing misclassifications by the discriminator network by producing novel candidates that the discriminator thinks are not synthesized (are part of the true data distribution)), thus producing statistically realistic candidates.

SUMMARY

Embodiments of the present invention disclose a computer-implemented method, a computer program product, and a system for network traffic anomaly detection and mitigation. The computer-implemented method includes one or more computer processers intercepting one or more network inputs entering or existing an internal network. The one or more computer processors synthesize one or more network input images from a random noise vector sampled from a normal distribution of textually embedded network inputs utilizing a trained generative adversarial network. The one or more computer processors classify one or more synthesized network input images by identifying contained objects utilizing a trained convolutional neural network with rectified linear units, wherein the objects include patterns, sequences, trends, and signatures. The one or more computer processors predict a security profile of the one or more classified network input images and associated one or more network inputs, wherein the security profiles includes a set of rules and associated mitigation actions, analogous historical network traffic, a probability of infection, a probability of signature match with historical malicious network inputs, and a harm factor. The one or more computer processors apply one or more mitigation actions based on the predicted security profile associated with the one or more network inputs.

DETAILED DESCRIPTION

Traditionally, intrusion detection systems (IDSs) monitor internal networks for potential unauthorized and/or malicious activity by detecting and identifying packet signatures. IDSs are disposed to frequent false alarms causing authorized or allowed network activity to be incorrectly flagged, logged, suspended, and/or terminated causing further errors, delays, network congestion, increased computational expenditures, and, ultimately, reduced network efficiency. Traditional IDSs need to be fine-tuned to the requirements and specifications of an internal network in order to effectively reduce false alarms while maintaining high malicious identification rate. Traditional IDS tuning is a substantially resource intensive process due to the quantity of potential network input/packet signatures which requires frequent manual intervention, thus increasing cost optimization and implementation requirements.

Embodiments of the present invention allow for a deep learning method for intrusion detection systems such as network-based intrusion detection systems (NIDS) and host-based intrusion detection systems (HIDS). Embodiments of the present invention monitor and analyze network traffic and ports utilizing a signature-based detection and anomaly-based detection techniques. Embodiments of the present invention apply unsupervised machine learning to network intrusion alarms (i.e., textual network data) generated by an IDS. Embodiments of the present invention convert raw textual data to image and/or graphical format utilizing a generative adversarial network (GAN) algorithm. Embodiments of the present invention classify generated images utilizing one or more classification models utilizing exploratory data analysis (EDA) and applied principal component analysis (PCA). In this embodiment, the present invention discovers network traffic patterns in generated images and predicts (e.g., flag, etc.) network anomalies while minimizing false positives (i.e., alarms). Embodiments of the present invention apply image recognition techniques, such as screenshot capturing techniques and chart dashboard analysis, to identify false positives and malicious anomalies while reducing network intrusion risk and computational requirements associated with traditional systems. Embodiments of the present invention dynamically adjust one or more intrusion models based on specific network patterns unique to one or more networks, hosts, and/or applications. Implementation of embodiments of the invention may take a variety of forms, and exemplary implementation details are discussed subsequently with reference to the Figures.

The present invention will now be described in detail with reference to the Figures.

Figure 1:
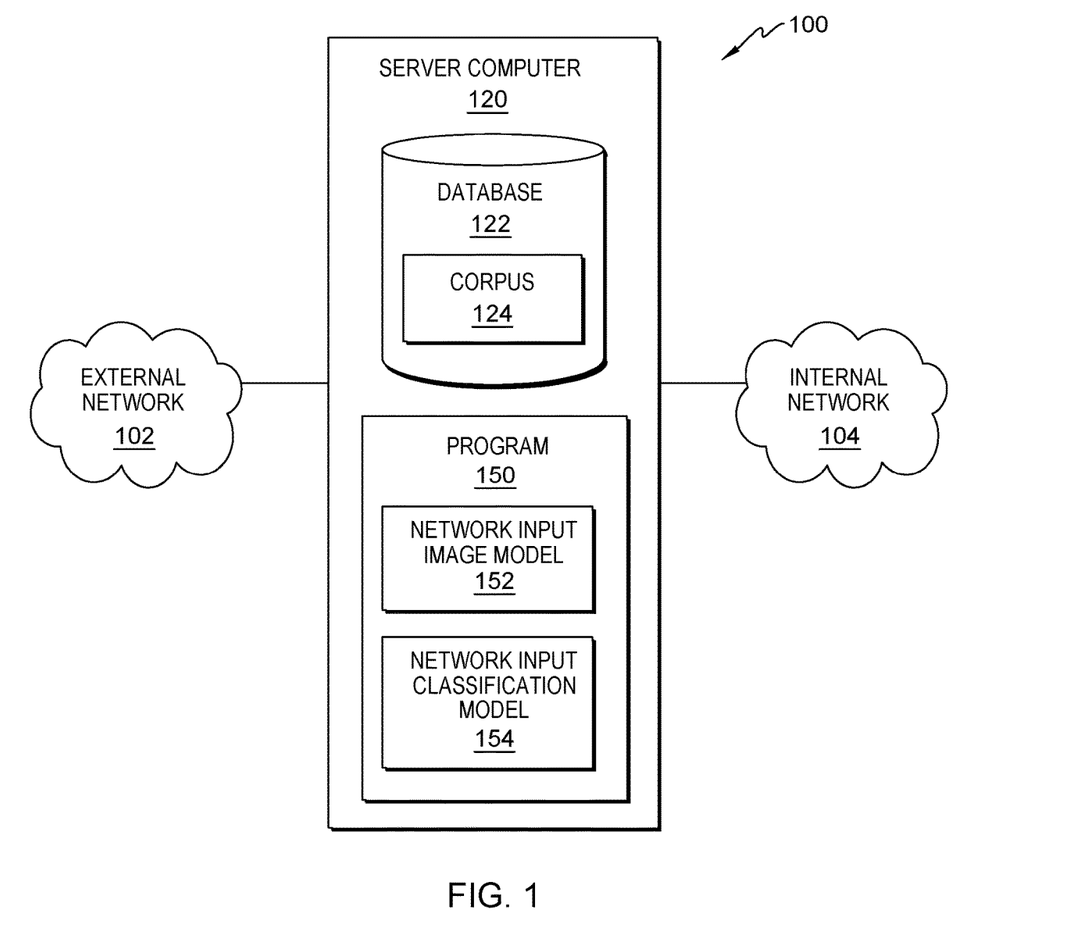
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over external network 102 and internal network 104. External network 102 and internal network 104 each can be, for example, a telecommunications network, a local area network (LAN), a wide area network (WAN), such as the Internet, or a combination of the three, and can include wired, wireless, or fiber optic connections. External network 102 and internal network 104 each can include one or more wired and/or wireless networks that are capable of receiving and transmitting data, voice, and/or video signals, including multimedia signals that include voice, data, and video information. In general, external network 102 and internal network 104 each can be any combination of connections and protocols that will support communications between server computer 120, and other computing devices (not shown) within computational environment 100. In various embodiments, external network 102 and internal network 104 each operates locally via wired, wireless, or optical connections and can be any combination of connections and protocols (e.g., personal area network (PAN), near field communication (NFC), laser, infrared, ultrasonic, etc.). In an embodiment, external network 102 is publicly accessible as a point of entry for a greater intranet or the internet. In an embodiment, internal network 104 is not publicly accessible. In this embodiment, internal network 104 is segmented (e.g., accessible only through controlled and monitored points) from external network 102 through server computer 120.

Server computer 120 can be an intrusion detection system, standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via external network 102 and/or internal network 104. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In another embodiment, server computer 120 is a network intrusion detection system (NIDS). In another embodiment, server computer 120 is a host intrusion detection system (HIDS). In various embodiments, server computer 120 controls the flow of network traffic between hosts located within external network 102 and hosts located within internal network 104. In other embodiments, server computer 120 may contain other applications, databases, programs, etc. which have not been depicted in computational environment 100. Server computer 120 may include internal and external hardware components, as depicted and described in further detail with respect to FIG. 6.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical generated network images, intrusion detection signatures; whitelisted/blacklisted hosts, ports, IPs, routes, hosts, and applications; historical anomalies and associated network input information; and historical false positives and associated network input information. In the depicted embodiment, database 122 includes corpus 124.

Corpus 124 contains a plurality of text-based corpora (i.e., packet information, console outputs, IDS signatures, historical anomalies, false positives, and authorized network traffic and associated metadata) and associated image-based corpora (i.e., network graphs, dashboards, etc.). In an embodiment, corpus 124 contains one or more historical generated image representations. In an embodiment, said historical anomalies are categorized, organized, and/or structured in relation to the specific host, route, application, location, or group. For example, all the historical generated image representations related to a location are aggregated. In various embodiments, the information contained in corpus 124 is temporally structured. For example, said information may be constrained or limited with regards to a specified period (e.g., network traffic generated in the last month).

Network input image model 152 and network input classification model 154 are representative of a plurality of models utilizing deep learning techniques to train, calculate weights, ingest inputs, and output a plurality of solutions (e.g., packet prediction, sequence identification, image analysis, image generation, etc.). In an embodiment, network input image model 152 and network input classification model 154 are comprised of any combination of deep learning models, techniques, and algorithms (e.g., decision trees, Naive Bayes classification, support vector machines for classification problems, random forest for classification and regression, linear regression, least squares regression, logistic regression). In an embodiment, network input image model 152 and network input classification model 154 utilize transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, network input classification model 154 is a CNN with a rectified linear unit (RELU) trained with supervised and/or unsupervised training methods. In this embodiment, program 150 utilizes network input classification model 154 to classify a network input as authorized, anomalous, or as a potential false positive.

In the depicted embodiment, network input image model 152 is a generative adversarial network (GAN) comprising two adversarial neural networks (i.e., generator and discriminator networks) trained utilizing unsupervised and supervised methods with images representative of an intended output image (i.e., generated network input image). In an embodiment, program 150 trains a discriminator utilizing known (i.e., historical) data as described in corpus 124. In another embodiment, program 150 initializes a generator utilizing randomized input data sampled from a predefined latent space (e.g. a multivariate normal distribution), thereafter, discriminator evaluates candidates synthesized by the generator. In this embodiment, program 150 applies backpropagation to both networks so that the generator produces better images, while the discriminator becomes more skilled at flagging synthetic images. In the depicted embodiment, the generator is a deconvolutional neural network and the discriminator is a convolutional neural network. The creation, training, and utilization of network input image model 152 and network input classification model 154 is depicted and described in further detail with respect to FIG. 2.

Program 150 is a program for network traffic anomaly detection and mitigation. In various embodiments, program 150 may implement the following steps: intercepting one or more network inputs entering or existing an internal network; synthesizing one or more network input images from a random noise vector sampled from a normal distribution of textually embedded network inputs utilizing a trained generative adversarial network; classifying one or more synthesized network input images by identifying contained objects utilizing a trained convolutional neural network with rectified linear units, wherein the objects include patterns, sequences, trends, and signatures; predicting a security profile of the one or more classified network input images and associated one or more network inputs, wherein the security profiles includes a set of rules and associated mitigation actions, analogous historical network traffic, a probability of infection, a probability of signature match with historical malicious network inputs, and a harm factor; and applying one or more mitigation actions based on the predicted security profile associated with the one or more network inputs. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over external network 102 and/or internal network 104. In various embodiments, client versions of program 150 resides on any other computing device (not depicted) within computational environment 100. Program 150 is depicted and described in further detail with respect to FIG. 2.

The present invention may contain various accessible data sources, such as database 122 and corpus 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

In various embodiments, the term "network input" (i.e., packet) should be construed having a broad meaning and should include all types of network encapsulations. Non-limiting examples of network inputs include internet protocol (IP), internet control message protocol (ICMP), user datagram protocol (UDP), transmission control protocol (TCP), associated routes, and services. In a further embodiment, a network input comprises control information and a data payload, where control information includes source address, destination address, error codes, and sequencing information. In an embodiment, network traffic comprises one or more network inputs or packets.

Figure 2:
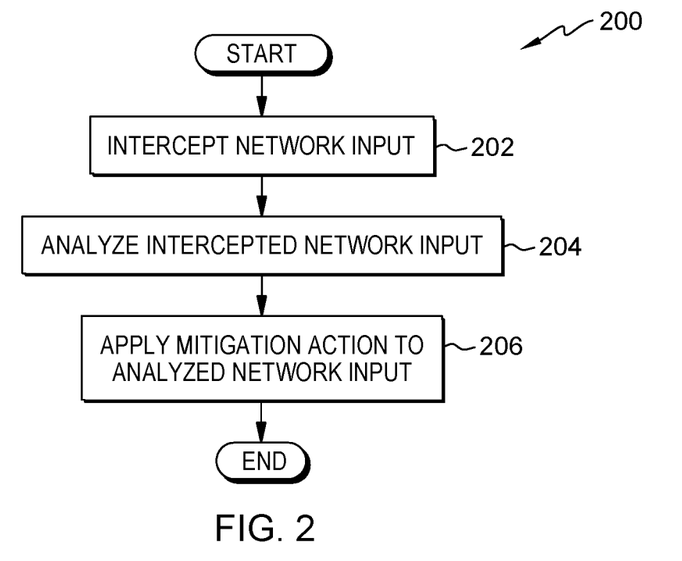
FIG. 2 is a flowchart depicting operational steps of a program, on a server computer within the computational environment of FIG. 1, for network traffic anomaly detection and mitigation, in accordance with an embodiment of the present invention.

FIG. 2 is a flowchart depicting operational steps of program 150 for network traffic anomaly detection and mitigation, in accordance with an embodiment of the present invention.

Program 150 intercepts a network input (step 202). In an embodiment, program 150 acts as an inline proxy and/or a transparent proxy 'sitting' in between the computing device and one or more subsequent computing devices, nodes, destination networks, and/or servers. In this embodiment, all network traffic entering and exiting an internal network (e.g., internal network 104) will route (e.g., travel, transmit, etc.) through program 150. In an embodiment, program 150 initiates responsive to an incoming (i.e., external network to internal network) or outgoing network input (i.e., internal network to external network). In various embodiments, program 150 monitors an entire internal network (e.g., intranet, company domain, etc.) and/or a subset of a network (e.g., subnet, private IP address range, types of network traffic, etc.). In another embodiment, program 150 manages, manipulates, and/or contains a network intrusion detection system (NIDS), situated in strategic points (e.g., networking bottlenecks, edge devices, routers, managed switches, etc.) within a network to monitor traffic to and from all devices on the network. In this embodiment, program 150 monitors all network traffic utilizing a network intrusion detection system to perform an analysis of passing network traffic on a subnet, wherein the network intrusion detection system analyzes packets, flow, sessions, packet payloads, traffic groupings, network session transitions, and transmissions.

In an embodiment, program 150 manages, manipulates, or contains a host intrusion detection system (HIDS) monitoring one or more hosts, sub-hosts, applications, routes, and/or ports. In various embodiments, program 150 (e.g., IDS) monitors inbound and outbound packets from a device in the form of textual logs and system events utilizing a HIDS. In a further embodiment, program 150 retrieves or receives a library of malicious signatures (e.g., historical or known cyber-attacks) containing textual, graphic-based, image-based, and video-based anomaly signatures. In an embodiment, program 150 identifies one or more network interfaces associated with a host and concurrently monitors (e.g., utilizing a HIDS) the operating system, application, and/or network interface for the initiation and detection of a data transmission (i.e., network input) or network connection/access request. In this embodiment, all network traffic to and from the host computing device will transmit through program 150. In another embodiment, program 150 monitors application activity to determine a network transmission and/or request. In an embodiment, responsive to intercepting one or more network inputs, program 150 suspends, flags, quarantines, diverts, stores, and/or logs the one or more network inputs.

Program 150 analyzes the intercepted network input (step 204). In an embodiment, program 150 extracts network input information from one or more intercepted network inputs, as described in step 302. In another embodiment, program 150 generated network input images based on the extracted network input information, as described in step 304. In another embodiment, program 150 classifies generated network input images, as described in step 306. In another embodiment, program 150 predicts a security profile of classified network input images, as described in step 308. In an embodiment, program 150 matches monitored network traffic to a library of malicious signatures. The analyzation procedure is further described and detailed in the flowchart and steps contained within FIG. 3.

Program 150 applies a mitigation action to analyzed network input (step 206). Program 150 applies one or more mitigation actions to one or more analyzed network inputs, as described in step 204. Responsive to a completed analyzation and calculated prediction, as described in FIG. 3, program 150 determines a mitigation action to apply to one or more packets based on a prediction and one or more associated probabilities. For example, program 150 quarantines a network input with associated high (e.g., >95%) probability of a malicious network input and associated activity/traffic. In another example, program 150 logs or flags a network input with a low (e.g., <40%) harm/risk factor and/or score (e.g., delay value, expected downtime, monetary costs, and expenditures, etc.). In an embodiment, program 150 transmits, passthroughs, monitors, modifies, suspends, flags, quarantines, diverts, stores, and/or logs the one or more network inputs based on one or more factors, scores, and/or probabilities contained in a network input prediction. For example, program 150 quarantines a plurality of malicious network inputs until an administrator approves the network traffic.

In an embodiment, program 150, based on one or more generated image representations as described in step 304, presents and/or adjusts generated image representations dependent on capabilities (e.g., display size, resolution, etc.) of an associated application (e.g., web based interface, etc.) or associated computing devices (not depicted). In various embodiments, program 150, displays, modifies, or presents one or more generated image representations. In various embodiments, program 150 displays one or more generated images on one or more associated computing and networking. In another embodiment, program 150 modifies, transforms, or adjusts one or more stylistic elements including, but not limited to, font, font size, character style, font color, background color, capitalizations, general transparency, and relative transparency, of a display or one or more displayed image representations. In some embodiments, program 150 transmits the generated image representation to one or more associated computing devices using a plurality of transmission methods including, but not limited to, GUI prompt, short message service (SMS), email, push notification, automated phone call, text-to-speech etc.

In an embodiment, program 150 logs the one or more analyzed network inputs into corpus 124. In an example embodiment, program 150 may receive user feedback through a graphical user interface (not depicted) on a computing device (not depicted). For example, after program 150 analyzes the network input, the user can provide feedback for the generated image on the user interface. In an embodiment, feedback may include a simple positive or negative response. For example, if program 150 incorrectly identifies one or more anomalies and associated generated images, the user can provide negative feedback and correct the image (e.g., before transmission). In an embodiment, program 150 feeds the user feedback and the corrected image into network input image model 152 allowing the adjustment of said model. In another embodiment, program 150 may use one or more techniques of NLP to log whether the response of the user is positive or negative. In various embodiments, program 150 combines the deep learning process explained above with traditional network intrusion network signature analysis to bolster security profile predictions. In this embodiment, program 150 updates a network input signature, a unique identifier for a network pattern or sequence of network inputs associated with a network description (e.g., malicious, authorized, etc.). In a further embodiment, program 150 applies the updated network input signatures to one or more downstream or upstream network devices such as an IDS. In another embodiment, program 150 retrains a plurality of associated models and networks with the calculated prediction and associated feedback.

Figure 3:
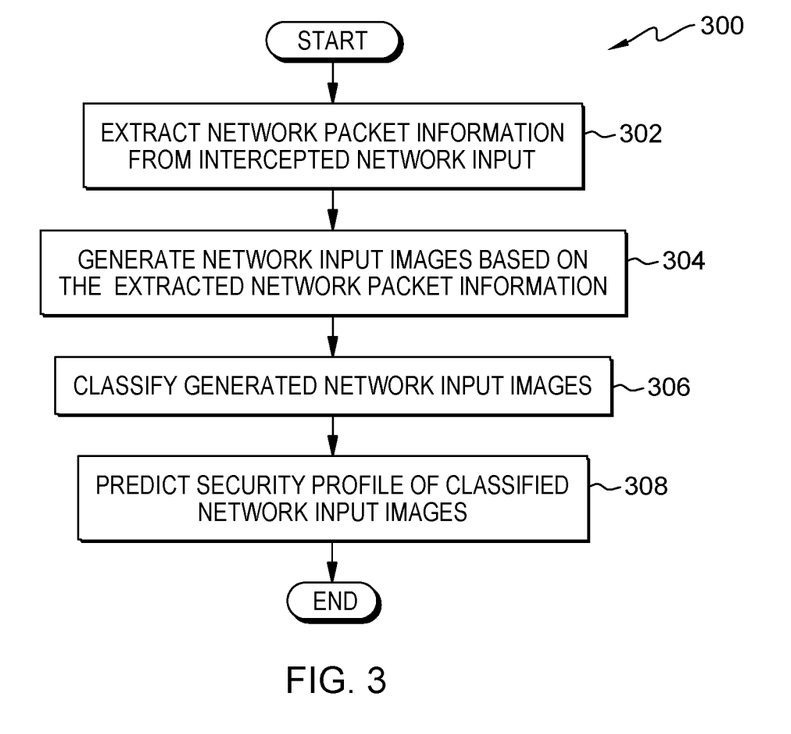
FIG. 3 is a flowchart depicting operational steps of a program, on a server computer within the computational environment of FIG. 1, for analyzing network traffic based on deep learning image generation and analysis, in accordance with an embodiment of the present invention.

FIG. 3 is a flowchart depicting operational steps of a program, on a server computer within the computational environment of FIG. 1, for analyzing network traffic based on deep learning image generation and analysis, in accordance with an embodiment of the present invention; and Program 150 extracts network input information from an intercepted network input (step 302). Program 150 extracts network input information from one or more intercepted (e.g., stored, quarantined, suspended, etc.) network inputs. In various embodiments, program 150 examines a network input or series of packets for certain network characteristics, such as matches on packet header or data payload information. In an embodiment, network input information includes IP address fields; the IP protocol field; IP options; IP fragment parameters; IP, TCP, and UDP checksums; IP and TCP port numbers; TCP flags, ICMP message types, time-to-live field (i.e., number of seconds a packet could survive on a network), and protocol field (i.e., TCP, UDP, ICMP, etc.). In another embodiment, program 150 creates network input information from a payload (e.g., malformed URLs) of a packet as well as the packet headers. In another embodiment, program 150 creates network input information from an alarm, false flag, and/or false positive transmitted from an intrusion detection and prevention system (IDPS) console. In an embodiment, program 150 utilizes deep recurrent neural network (RNN) to creates one or more instances and sets of instances of textual embeddings of extracted network input information. In this embodiment, the created embeddings uniquely contain vectorized visual attributes of the underlying network input information. In various embodiments, program 150 clusters, groups, and/or associates a plurality of network inputs associated with a transaction (e.g., complete data transmission, network request, network sequence, etc.).

Program 150 generates network input images based on the extracted network input information (step 304). In an embodiment, program 150 creates a generative adversarial network (GAN) (e.g., network input image model 152) comprising a generator model and a discriminator model. In this embodiment, program 150, initially, trains said models utilizing supervised methods with images representative of an intended image style (e.g., graphical, charts, graphs, etc.). In the depicted embodiment, the generator is a deconvolutional neural network and the discriminator is a convolutional neural network. Responsive to the creation and training of the image model, program 150 generates or converts one or more textual embeddings of network input information into images (e.g., graphs) using a GAN architecture and an associated GAN algorithm, such as a deep convolutional GAN. In this embodiment, program 150 synthesizes one or more network input images from a random noise vector sampled from a normal distribution of network input information. In an embodiment, program 150 utilizes equation 1, as follows, a conditional-GAN (cGAN) algorithm for a noise distribution dataset:

$$L_{GAN} = E_{t1,t2} \sim P_{data}[\log(1 - D(G(z, B_{t1} + (1 - B_{t2}))))] \quad (1)$$

where $P_{data}$ is a real data distribution, z is a data sample, $G_t$ is a generator, $D_t$ is a discriminator, B interpolates between text embeddings t1 and t2. In an embodiment, program 150 utilizes equation 2, as follows, a GAN algorithm for converting textual network input information into an image format:

$$\frac{1}{N} \sum_{n=1}^{N} \Delta(y_n, f_v(v_n)) + \Delta(y_n, f_t(t_n)) \quad (2)$$

where $\{(v_n, t_n, y_n: n=1, \ldots, N)\}$ is a training data set, $\Delta$ is a 0-1 loss, $v_n$ are images, $t_n$ are corresponding text descriptions, $y_n$, are class labels and $f_v$ and $f_t$ are classifiers.

In an additional embodiment, program 150 utilizes a GAN with re-description techniques to generate the network input images. In this embodiment, program 150 applies text-to-image generation by re-description and consisting of a semantic text embedding (i.e., generating word and sentence level embeddings), global-local collaborative attentive modules for cascaded image generation (i.e., generating target images from coarse to fine scales, leveraging both local word attention and global sentence attention to progressively enhance the diversity and semantic consistency of the generated images), and semantic text regeneration and alignment module (i.e., regenerates text description from generated image thereby semantically aligning with a given text). In an embodiment, program 150 groups and/or clusters one or more generated network input images based on temporal situation, associations with similar network inputs, historical images, historical network inputs, etc.

Program 150 classifies generated network input images (step 306). Responsive to the creation and/or generation of one or more network input images for one or more network inputs, program 150 performs utilize object and image recognition techniques to apply descriptive tags or labels to said generated network images. In an embodiment, program 150 utilizes a trained CNN with a rectified linear unit (RELU) (i.e., piecewise linear function), such as network input classification model 154, where contained neurons in a layer do not fully connect to all neurons in a subsequent layer. In an embodiment, program 150 utilizes the trained CNN with RELU to identify objects (e.g., patterns, sequences, trends, signatures, etc.) in generated images and graphs. In this embodiment, program 150 classifies generated images based on identified objects contained within graphical network information.

Responsive to one or more generated network image classifications, program 150 aggregates and groups classified images based on network traffic, protocols, and extracted network information. In this embodiment, program 150 utilizes K-means (KNN) clustering and exploratory data analysis (EDA) to identify and summarize network patterns and characteristics. In this embodiment, program 150 utilizes a multivariate box plot applied network information associated with generated network image with trained samples respective to X (i.e., false alerts/positives) and Y (i.e., anomaly). In a further embodiment, program 150 utilizing dimension reduction techniques on any dimension model (e.g., principal component analysis (PCA)) converting a set of observations of probable correlated variables into a set of valued variables. In an embodiment, program 150 clusters the generated network input images based on network flow, packet flow, and IP groupings. In various embodiments, program 150 groups a plurality of generated network input images associated with a sequence of network inputs. In an embodiment, program 150 identifies potential attacks spread or fragmented across a plurality of network inputs and connections. In this embodiment, program 150 identifies said attacks through overlapping generated images and compared generated images for high similarity. In various embodiments, program 150 utilizes KNN to cluster one or more classified network input images and create one or more sets of similarly classified network inputs.

Program 150 predicts a security profile of classified network input images (step 308). Program 150 predicts a security profile (e.g., set of rules and associated mitigation actions, analogous network traffic, and historical traffic and associated actions) of one or more classified network input images associated with one or more intercepted network inputs. In an embodiment, security profiles include one or more of the following: probability of infection, probability of signature match with malicious network input or packets, similar networking patterns, probability of approved traffic, and harm factor due to increased network suspension or network termination (e.g., harm caused by blocking or holding approved or non-malicious network inputs). For example, program 150 predicts that a sequence of network inputs is associated with a high probability of a TCP attack or SYN flood. In various embodiments, predictions may include TCP host sweeps, TCP SYN floods, TCP port scans, TCP session hijacking, TCP traffic records, TCP applications, e-mail attacks, NetBIOS attacks, web attacks, UDP port scans, UDP applications, UDP traffic records, distributed DoS (DDoS) attacks, DNS attacks, Loki attacks, authentication attacks, and RPC attacks. In this embodiment, program 150 utilizes a trained CNN to output one or more sets of probabilities denoting the likelihood that the network is malicious. In an embodiment, program 150 utilizes the trained CNN to compare clustered and processed generated network input images with historical/known malicious or approved network traffic. In another embodiment, program 150 the trained CNN to calculate a similarity score representing a probability of similarity between a generated network input image and a historical network input image (e.g., image labeled with an application, host, security profile, etc.). In this embodiment, program 150 computes a similarity score indicating a probability of image similarity for the synthesized image to a respective historical network image. In a further embodiment, program 150 weights each of the aforementioned results in proportion to the degree of topic confidence associated and calculated from the analyzation and classification processed described in step 306. In another embodiment, program 150 utilizes one or more prediction thresholds (i.e., p-value), for example 95%, to determine a prediction for one or more network inputs and associated generated images. In an example, program 150 sets a set of thresholds where a prediction or probability value of less than 50% confidence (i.e., malicious prediction) is authorized traffic, 51%-94% are false positives, and above 95% is malicious traffic. Responsively, program 150 initiates one or more mitigation actions or techniques as described in step 206 in accordance with one or more network input predictions.

Figure 4:
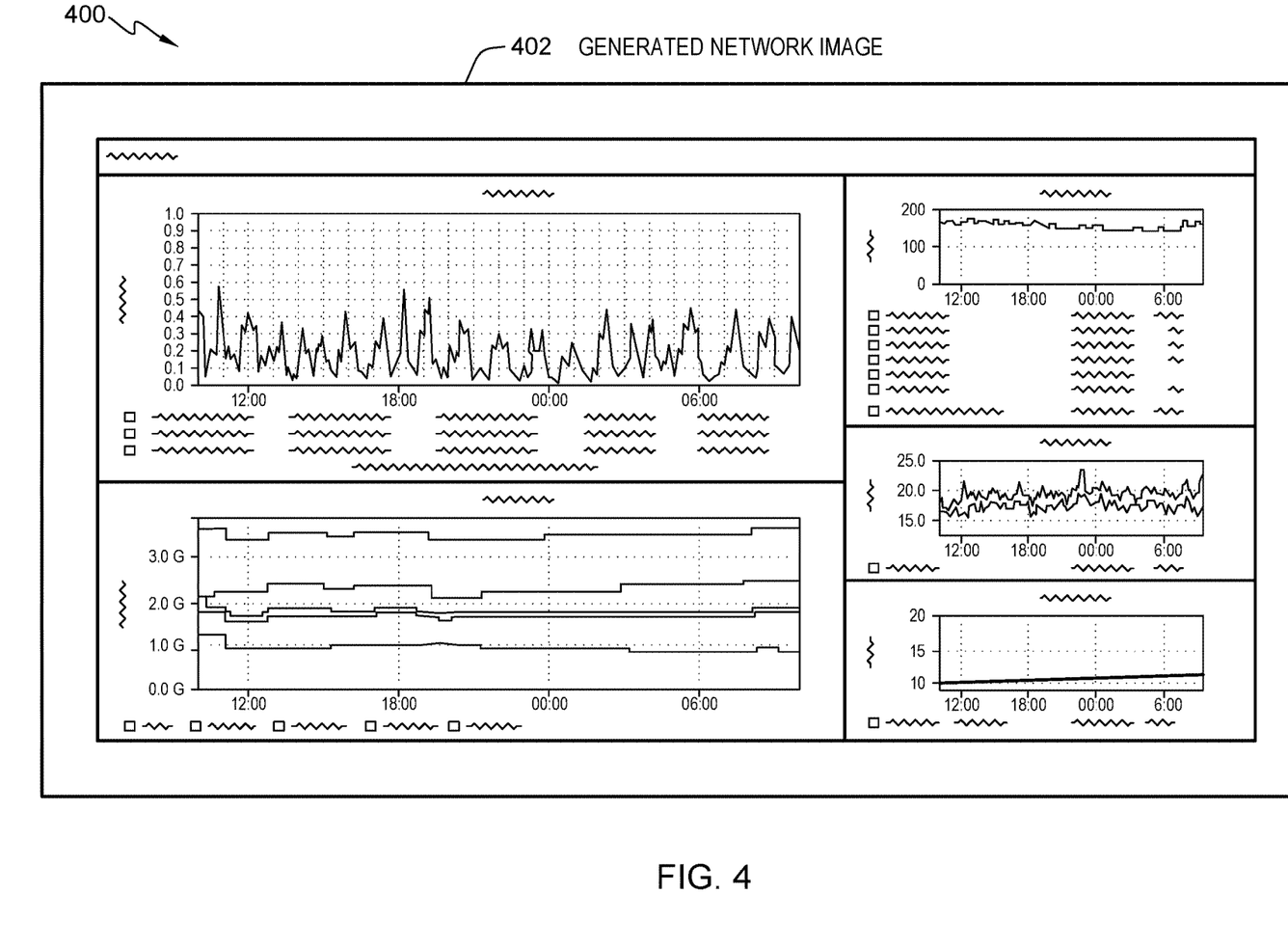
FIG. 4 is an exemplary generated network image, in accordance with an embodiment of the present invention.

FIG. 4 depicts an exemplary generated network image, in accordance with an embodiment of the present invention. FIG. 4 contains generated network image 402 representative of a generated network input image by a trained GAN as described in step 304. Generated network image 402 is an exemplary generated image (e.g., chart) dashboard depicting a plurality of generated charts associated with one or more intercepted network inputs.

Figure 5:
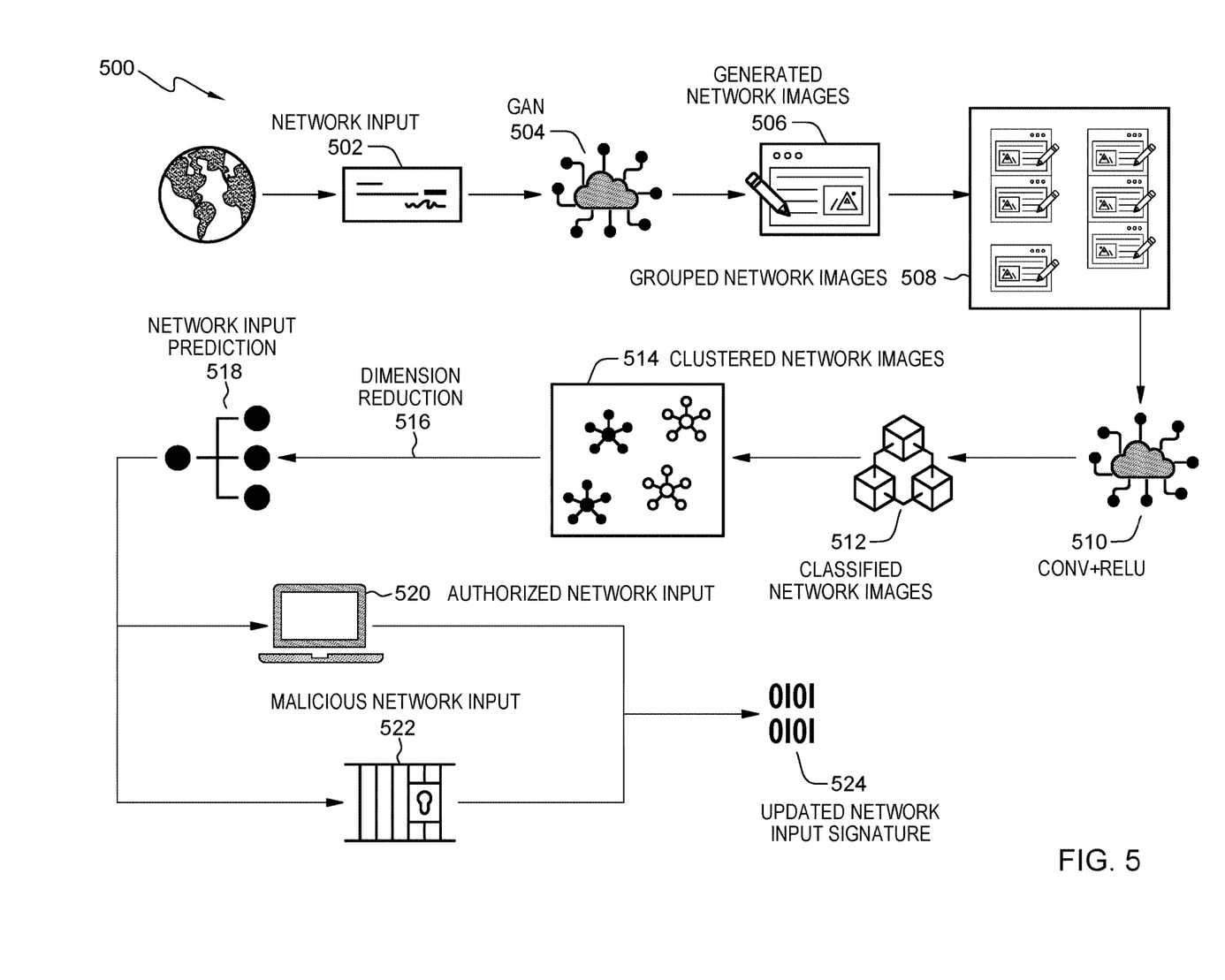
FIG. 5 is a flowchart depicting exemplary steps of a program, on a server computer within the computational environment of FIG. 1, in accordance with an embodiment of the present invention.

FIG. 5 depicts exemplary flowchart 500 depicting exemplary operational steps of a program in accordance with an embodiment of the present invention. Program 150 initiates responsive to detecting, receiving, and/or intercepting network input 502, an inbound request for a file transfer through file transfer protocol (FTP), as described in step 202. Program 150 initiates an analyzation of intercepted network input 502, as described in step 204 and in steps 302-308. Program 150 extracts a plurality of network information from network input 502 and inputs the extracted network information into GAN 504, a GAN trained to generate network images from network information, as described in step 302. Program 150, responsively, utilizes GAN 504 to generate generated network images 506 representative of one or more of generated network images, as described in step 304. Further, program 150 groups or clusters generated network images 506 into grouped network images 508. Program 150 utilizes CONV+RELU 510 to identify one or more areas of interest contained in grouped network images 508 and create/classify classified network images 512 based on calculated similarity scores, as described in step 306. Program 150 then further clusters classified network images 512, creating clustered network images 514, while concurrently applying dimension reduction 516, exemplary of a plurality of dimension reduction techniques. Program 150 utilizes the reduced clustered network images 514 to calculate network input prediction 518 contained one or more predictions (e.g., authorized, false, malicious traffic) and associated probabilities, as described in step 308. Program 150 utilizes network input prediction 518 to determine and apply one or more mitigation actions such as authorized network input 520, allows network input to passthrough uninterrupted, and malicious network input 522, quarantines network input, as described in step 206. Responsive to an applied mitigation action, program 150 retrains one or more associated models and network with the prediction and any feedback. Additionally, program 150 applies updated network input signature 524 to one or more network devices (IDS), reducing future false positives and improving network efficiency.

Figure 6:
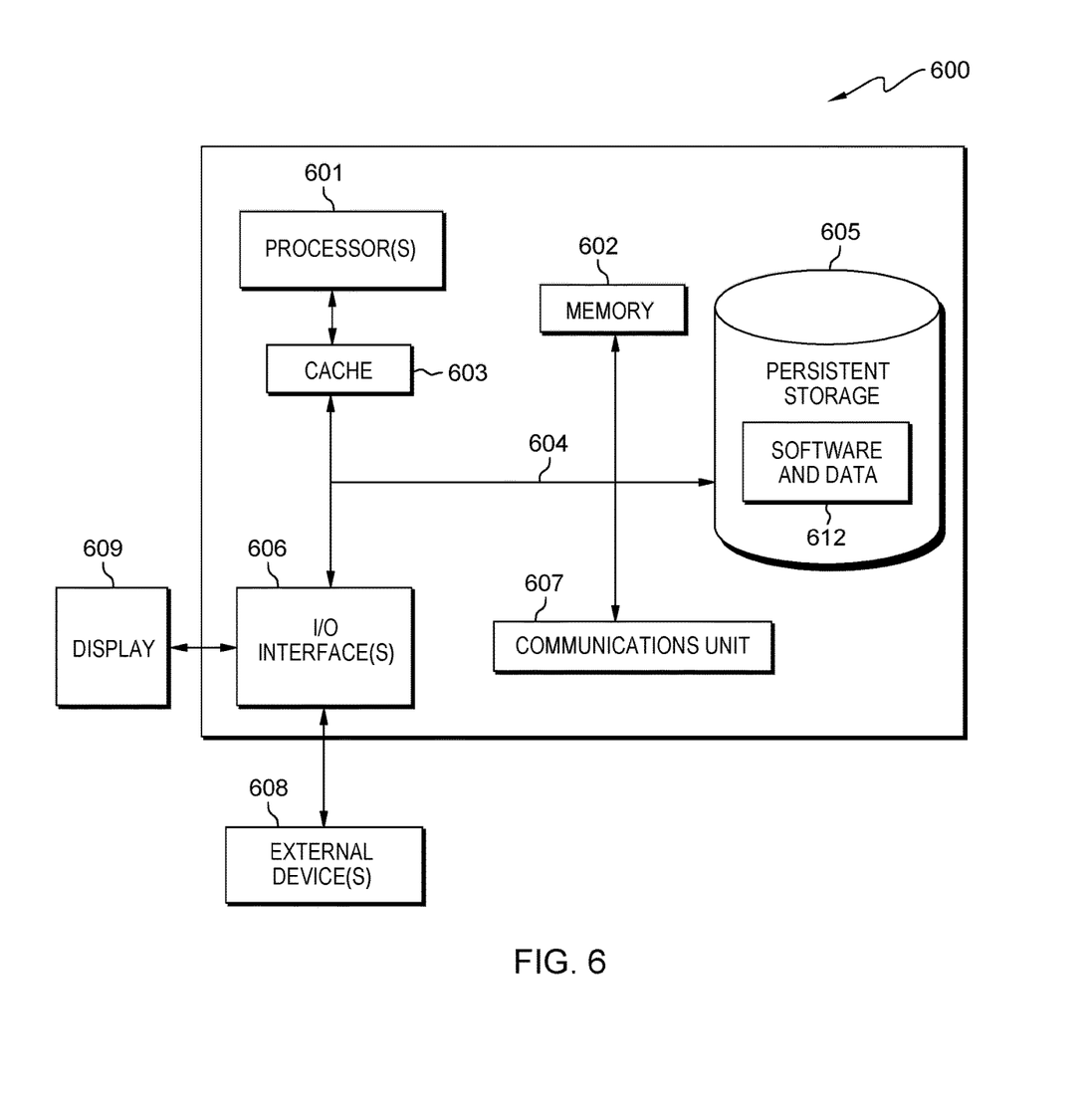
FIG. 6 is a block diagram of components of the server computer, in accordance with an embodiment of the present invention.

FIG. 6 depicts a block diagram of components of server computer 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 120 each include communications fabric 604, which provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 can be stored in persistent storage 605 for access and/or execution by one or more of the respective processors 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected to server computer 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

intercepting, by one or more computer processors, one or more network inputs entering or existing an internal network, wherein the one or more computer processors comprise one or more hardware computer processors;

synthesizing, by the one or more computer processors, one or more network input images from a random noise vector sampled from a normal distribution of textually embedded network inputs utilizing a trained generative adversarial network;

classifying, by the one or more computer processors, one or more synthesized network input images by identifying contained objects utilizing a trained convolutional neural network with rectified linear units, wherein the objects include patterns, sequences, trends, and signatures;

predicting, by the one or more computer processors, a security profile of the one or more classified network input images and associated one or more network inputs, wherein the security profiles includes a set of rules and associated mitigation actions, analogous historical network traffic, a probability of infection, a probability of signature match with historical malicious network inputs, and a harm factor; and applying, by the one or more computer processors, one or more mitigation actions based on the predicted security profile associated with the one or more network inputs.

2. The method of claim 1, further comprising:

reducing, by the one or more computer processors, subsequent false positives by updating one or more intrusion detection system signatures with the predicted security profile.

3. The method of claim 1, further comprising:

monitoring, by the one or more computer processors, inbound and outbound network inputs utilizing a host intrusion detection system and a library containing textual, graphic-based, image-based, and video-based anomaly signatures.

4. The method of claim 1, further comprising:

monitoring, by the one or more computer processors, all network traffic utilizing a network intrusion detection system to perform an analysis of passing network traffic on a subnet, wherein the network intrusion detection system analyzes packets, flow, sessions, packet payloads, traffic groupings, network session transitions and transmissions; and matching, by the one or more computer processors, the monitored network traffic to a library of malicious signatures.

5. The method of claim 1, wherein classifying one or more synthesized network input images by identifying contained objects utilizing the trained convolutional neural network with rectified linear units, wherein the objects include patterns, sequences, trends, and signatures further comprises:

calculating, by the one or more computer processors, a similarity score indicating a probability of image similarity for the synthesized image to a respective historical network image.

6. The method of claim 1, wherein the mitigation actions include transmitting, monitoring, modifying, suspending, flagging, quarantining, diverting, storing, or logging based on one or more factors, scores, and probabilities contained in the predicted security profile.

7. The method of claim 1, wherein synthesizing one or more network input images from the random noise vector sampled from the normal distribution of textually embedded network inputs utilizing the trained generative adversarial network, further comprises:

applying, by the one or more computer processors, text-to-image generation through re-description comprising a semantic text embedding, global-local collaborative attentive for cascaded image generation, semantic text regeneration, and semantic text regeneration alignment.

8. A computer program product comprising:
one or more computer readable storage media and program instructions stored on the one or more computer readable storage media, the stored program instructions comprising:
program instructions to intercept one or more network inputs entering or existing an internal network;
program instructions to synthesize one or more network input images from a random noise vector sampled from a normal distribution of textually embedded network inputs utilizing a trained generative adversarial network;
program instructions to classify one or more synthesized network input images by identifying contained objects utilizing a trained convolutional neural network with rectified linear units, wherein the objects include patterns, sequences, trends, and signatures;
program instructions to predict a security profile of the one or more classified network input images and associated one or more network inputs, wherein the security profiles includes a set of rules and associated mitigation actions, analogous historical network traffic, a probability of infection, a probability of signature match with historical malicious network inputs, and a harm factor; and
program instructions to apply one or more mitigation actions based on the predicted security profile associated with the one or more network inputs.

9. The computer program product of claim 8, wherein the program instructions, stored on the one or more computer readable storage media, further comprise:
program instructions to reduce subsequent false positives by updating one or more intrusion detection system signatures with the predicted security profile.

10. The computer program product of claim 8, wherein the program instructions, stored on the one or more computer readable storage media, further comprise:
program instructions to monitor inbound and outbound network inputs utilizing a host intrusion detection system and a library containing textual, graphic-based, image-based, and video-based anomaly signatures.

11. The computer program product of claim 8, wherein the program instructions, stored on the one or more computer readable storage media, further comprise:
program instructions to monitor all network traffic utilizing a network intrusion detection system to perform an analysis of passing network traffic on a subnet, wherein the network intrusion detection system analyzes packets, flow, sessions, packet payloads, traffic groupings, network session transitions and transmissions; and
program instructions to match the monitored network traffic to a library of malicious signatures.

12. The computer program product of claim 8, wherein the program instructions to classify one or more synthesized network input images by identifying contained objects utilizing the trained convolutional neural network with rectified linear units, wherein the objects include patterns, sequences, trends, and signatures, further comprise:
program instructions to calculate a similarity score indicating a probability of image similarity for the synthesized image to a respective historical network image.

13. The computer program product of claim 8, wherein mitigation actions includes transmitting, monitoring, modifying, suspending, flagging, quarantining, diverting, storing, or logging based on one or more factors, scores, and probabilities contained in the predicted security profile.

14. The computer program product of claim 8, wherein the program instructions to synthesize one or more network input images from the random noise vector sampled from the normal distribution of textually embedded network inputs utilizing the trained generative adversarial network, further comprise:
program instructions to apply text-to-image generation through re-description comprising a semantic text embedding, global-local collaborative attentive for cascaded image generation, semantic text regeneration, and semantic text regeneration alignment.

15. A computer system comprising:
one or more hardware computer processors;
one or more computer readable storage media; and
program instructions stored on the computer readable storage media for execution by at least one of the one or more processors, the stored program instructions comprising:
program instructions to intercept one or more network inputs entering or existing an internal network;
program instructions to synthesize one or more network input images from a random noise vector sampled from a normal distribution of textually embedded network inputs utilizing a trained generative adversarial network;
program instructions to classify one or more synthesized network input images by identifying contained objects utilizing a trained convolutional neural network with rectified linear units, wherein the objects include patterns, sequences, trends, and signatures;
program instructions to predict a security profile of the one or more classified network input images and associated one or more network inputs, wherein the security profiles includes a set of rules and associated mitigation actions, analogous historical network traffic, a probability of infection, a probability of signature match with historical malicious network inputs, and a harm factor; and
program instructions to apply one or more mitigation actions based on the predicted security profile associated with the one or more network inputs.

16. The computer system of claim 15, wherein the program instructions, stored on the one or more computer readable storage media, further comprise:
program instructions to monitor inbound and outbound network inputs utilizing a host intrusion detection system and a library containing textual, graphic-based, image-based, and video-based anomaly signatures.

17. The computer system of claim 15, wherein the program instructions, stored on the one or more computer readable storage media, further comprise:
program instructions to monitor all network traffic utilizing a network intrusion detection system to perform an analysis of passing network traffic on a subnet, wherein the network intrusion detection system analyzes packets, flow, sessions, packet payloads, traffic groupings, network session transitions and transmissions; and
program instructions to match the monitored network traffic to a library of malicious signatures.

18. The computer system of claim 15, wherein the program instructions to classify one or more synthesized network input images by identifying contained objects utilizing the trained convolutional neural network with rectified linear units, wherein the objects include patterns, sequences, trends, and signatures, further comprise:

program instructions to calculate a similarity score indicating a probability of image similarity for the synthesized image to a respective historical network image.

19. The computer system of claim 15, wherein mitigation actions includes transmitting, monitoring, modifying, suspending, flagging, quarantining, diverting, storing, or logging based on one or more factors, scores, and probabilities contained in the predicted security profile.

20. The computer system of claim 15, wherein the program instructions to synthesize one or more network input images from the random noise vector sampled from the normal distribution of textually embedded network inputs utilizing the trained generative adversarial network, further comprise:

program instructions to apply text-to-image generation through re-description comprising a semantic text embedding, global-local collaborative attentive for cascaded image generation, semantic text regeneration, and semantic text regeneration alignment.

* * * * *